US012341232B2

(12) United States Patent
Sasaki et al.

(10) Patent No.: US 12,341,232 B2
(45) Date of Patent: Jun. 24, 2025

(54) IRREVERSIBLE CIRCUIT ELEMENT AND METHOD OF MANUFACTURING IRREVERSIBLE CIRCUIT ELEMENT

(71) Applicant: TDK CORPORATION, Tokyo (JP)

(72) Inventors: Tomoyuki Sasaki, Tokyo (JP); Yoshiaki Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/917,738

(22) PCT Filed: Feb. 15, 2022

(86) PCT No.: PCT/JP2022/005912
§ 371 (c)(1),
(2) Date: Oct. 7, 2022

(87) PCT Pub. No.: WO2023/157069
PCT Pub. Date: Aug. 24, 2023

(65) Prior Publication Data
US 2025/0079676 A1 Mar. 6, 2025

(51) Int. Cl.
*H01P 1/32* (2006.01)
*H01P 1/36* (2006.01)
(Continued)

(52) U.S. Cl.
CPC .................. *H01P 1/36* (2013.01); *H01P 1/32* (2013.01); *H01P 1/38* (2013.01); *H01P 1/387* (2013.01)

(58) Field of Classification Search
CPC .... H01P 1/32; H01P 1/36; H01P 1/365; H01P 1/37; H01P 1/375; H01P 1/38; H01P 1/383; H01P 1/387; H01P 1/393
See application file for complete search history.

(56) References Cited

U.S. PATENT DOCUMENTS

2011/0051227 A1 3/2011 Arahira
2011/0073783 A1 3/2011 Arahira
(Continued)

FOREIGN PATENT DOCUMENTS

JP H02-055406 A 2/1990
JP H10-004304 A 1/1998
(Continued)

OTHER PUBLICATIONS

English Translation of May 13, 2025 Office Action issued in JP Patent Application No. 2022-552138.

*Primary Examiner* — Stephen E. Jones
(74) *Attorney, Agent, or Firm* — Oliff PLC

(57) ABSTRACT

An irreversible circuit element includes: a housing; a plurality of irreversible circuit plates accommodated in the housing; and a plurality of terminals connected to an outer surface of the housing, the plurality of irreversible circuit plates are arranged such that the adjacent irreversible circuit plates face each other, each of the plurality of irreversible circuit plates includes a metal layer, a first insulating layer, a loss layer, and a first magnetic field applying layer laminated in sequence in a thickness direction, each of the plurality of irreversible circuit plates transmits a signal irreversibly between a first end and a second end, and the first end and the second end of each of the plurality of irreversible circuit plates are connected to different terminals of the plurality of terminals.

20 Claims, 6 Drawing Sheets

(51) Int. Cl.
*H01P 1/38* (2006.01)
*H01P 1/387* (2006.01)

(56) References Cited

U.S. PATENT DOCUMENTS

| | | | | |
|---|---|---|---|---|
| 2011/0193649 | A1* | 8/2011 | Popelka | H01P 1/387 333/1.1 |
| 2013/0258453 | A1 | 10/2013 | Arahira | |
| 2017/0093381 | A1 | 3/2017 | Abdo | |
| 2019/0131683 | A1 | 5/2019 | Abdo | |

FOREIGN PATENT DOCUMENTS

| | | | |
|---|---|---|---|
| JP | H11-298208 | A | 10/1999 |
| JP | 2006-133726 | A | 5/2006 |
| JP | 2007-511178 | A | 4/2007 |
| JP | 2007-288701 | A | 11/2007 |
| JP | 2011-048093 | A | 3/2011 |
| JP | 2011-075889 | A | 4/2011 |
| JP | 2013-025253 | A | 2/2013 |
| JP | 2013-172326 | A | 9/2013 |
| JP | 2013-205711 | A | 10/2013 |
| JP | 2014-067060 | A | 4/2014 |
| JP | 2014-067061 | A | 4/2014 |
| JP | 2020-205424 | A | 12/2020 |
| JP | 6998459 | B2 | 1/2022 |
| WO | 2005/046114 | A2 | 5/2005 |
| WO | 2017/055988 | A1 | 4/2017 |
| WO | 2018/069908 | A1 | 4/2018 |
| WO | 2018/185542 | A1 | 10/2018 |
| WO | 2019/063113 | A1 | 4/2019 |
| WO | 2019/086943 | A1 | 5/2019 |
| WO | 2019/117949 | A1 | 6/2019 |
| WO | 2020/160920 | A1 | 8/2020 |
| WO | 2020/197833 | A1 | 10/2020 |
| WO | 2020/212092 | A1 | 10/2020 |

* cited by examiner

IRREVERSIBLE CIRCUIT ELEMENT AND METHOD OF MANUFACTURING IRREVERSIBLE CIRCUIT ELEMENT

TECHNICAL FIELD

The present invention relates to an irreversible circuit element and a method of manufacturing an irreversible circuit element.

BACKGROUND ART

An irreversible circuit element is an element configured to define a transmission direction of a high-frequency signal. An isolator or a circulator is an example of an irreversible circuit element. Irreversible circuit elements are widely used in circuits to which a high-frequency signal is transmitted.

An irreversible circuit element is used in various places where high-frequency signals are used. For example, Patent Literature 1 discloses that an isolator is used in a quantum computer. Patent Literature 1 discloses that commercially available cryogenic isolators have problems such as a large size, a heavy weight, and the like.

CITATION LIST

Patent Literature

Patent Literature 1

Japanese Patent No. 6998459

SUMMARY OF INVENTION

Technical Problem

For example, as disclosed in Patent Literature 1, miniaturization of an irreversible circuit element is required in order to reduce a space in an extremely low temperature environment in which a quantum computer is operated. In addition, miniaturization of the irreversible circuit element is also required from the viewpoints of increasing use of the irreversible circuit element under extreme environments such as in space, the bottom of the sea, underground, and the like, securing a space under these extreme environments and reducing conveyance costs.

In consideration of the above-mentioned circumstances, the present invention is directed to provide an irreversible circuit element and a method of manufacturing the same that are capable of miniaturization with high integration efficiency.

Solution to Problem

In order to solve the above-mentioned problems, the present invention provides the following means.

An irreversible circuit element according to an embodiment includes: a housing; a plurality of irreversible circuit plates accommodated in the housing; and a plurality of terminals connected to an outer surface of the housing. The plurality of irreversible circuit plates are arranged such that the adjacent irreversible circuit plates face each other. Each of the plurality of irreversible circuit plates includes a metal layer, a first insulating layer, a loss layer, and a first magnetic field applying layer laminated in sequence in a thickness direction. Each of the plurality of irreversible circuit plates transmits a signal irreversibly between a first end and a second end. The first end and the second end of each of the plurality of irreversible circuit plates are connected to different terminals of the plurality of terminals.

Advantageous Effects of Invention

The irreversible circuit element according to the present invention enables miniaturization with high integration efficiency. A method of manufacturing the irreversible circuit element according to the present invention enables fabrication of a small irreversible circuit element.

DESCRIPTION OF EMBODIMENTS

Figure 1:
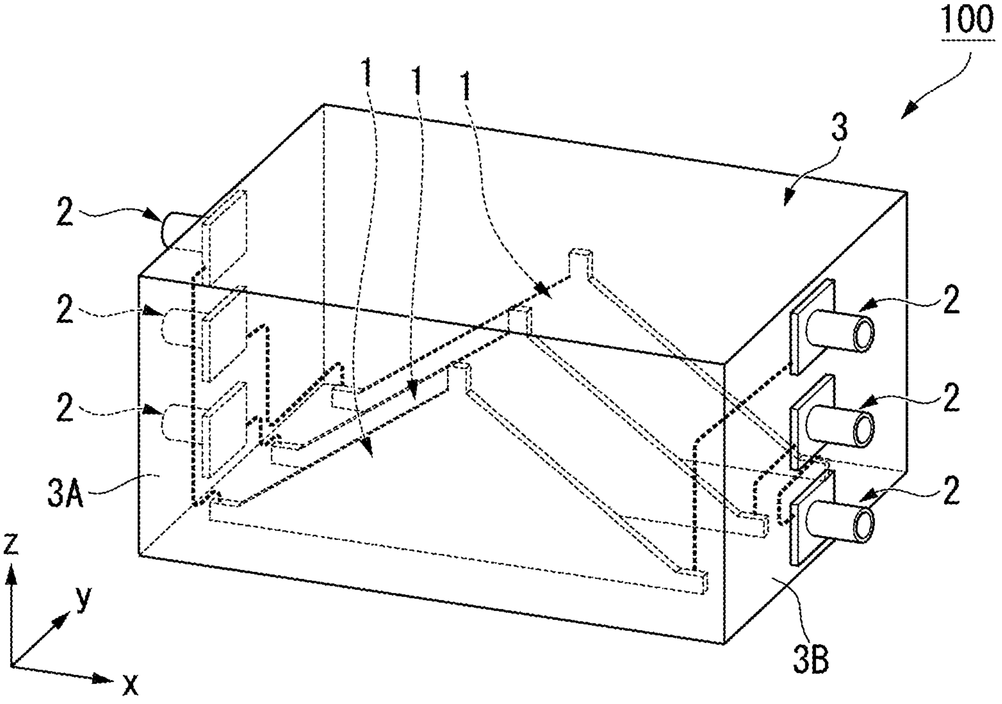
FIG. 1 is a perspective view of an irreversible circuit element according to a first embodiment.

Hereinafter, an embodiment of the present invention will be described in detail with reference to the accompanying drawings. In the drawings used in the following description, in order to make the features easier to understand, the characteristic parts may be enlarged for convenience, and dimensional ratios of the components may differ from the actual ones. The materials, dimensions, and the like, exemplified in the following description are only examples, and the present invention is not limited thereto and may be appropriately changed and performed within the scope of the present invention that exhibit the effects thereof.

First, directions will be defined. A direction of a surface in which an irreversible circuit plate 1 extends is referred to as an x direction, and a direction perpendicular to the x direction is referred to as a z direction. A direction perpendicular to the x direction and the z direction is referred to as a y direction.

First Embodiment

Figure 2:
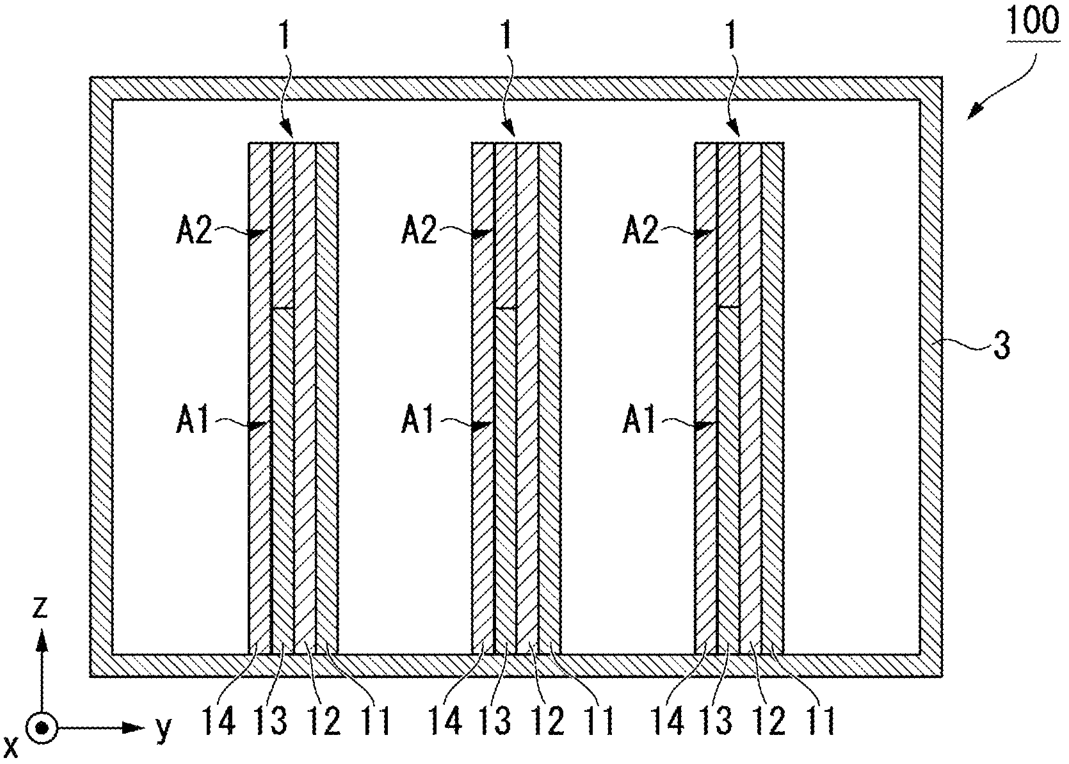
FIG. 2 is a cross-sectional view of the irreversible circuit element according to the first embodiment.

FIG. 1 is a perspective view of an irreversible circuit element 100 according to a first embodiment. FIG. 2 is a cross-sectional view of the irreversible circuit element 100 according to the first embodiment. FIG. 2 is a cross section cut along a surface perpendicular to a surface in which the irreversible circuit plate 1 expands. The irreversible circuit element 100 shown in FIGS. 1 and 2 functions as, for example, an isolator.

The irreversible circuit element 100 has a plurality of irreversible circuit plates 1, a plurality of terminals 2, and a housing 3.

Each of the irreversible circuit plates 1 is accommodated in the housing 3. Each of the terminals 2 is connected to an outer surface of the housing 3. Each of the irreversible circuit plates 1 is connected to any one of the terminals 2. The terminals 2 and the housing 3 are known substances.

Each of the irreversible circuit plates 1 is aligned with a facing adjacent irreversible circuit plate 1. The irreversible circuit plates 1 are spaced apart and arranged in, for example, the y direction. Since the irreversible circuit plates 1 are arranged in a direction crossing an xz plane on which the irreversible circuit plates 1 expand, a degree of integration of the irreversible circuit plates 1 in the housing 3 can be increased.

Each of the irreversible circuit plates 1 has a metal layer 11, a first insulating layer 12, a loss layer 13, and a first magnetic field applying layer 14 in a thickness direction. The thickness direction coincides with, for example, the y direction. A magnetic field generated in the first magnetic field applying layer 14 is input to the metal layer 11 via the loss layer 13. A direction of a signal transmitted through the metal layer 11 is defined by an intensity of a magnetic field applied to the metal layer 11 by the loss layer 13 differing depending on a location.

Figure 3:
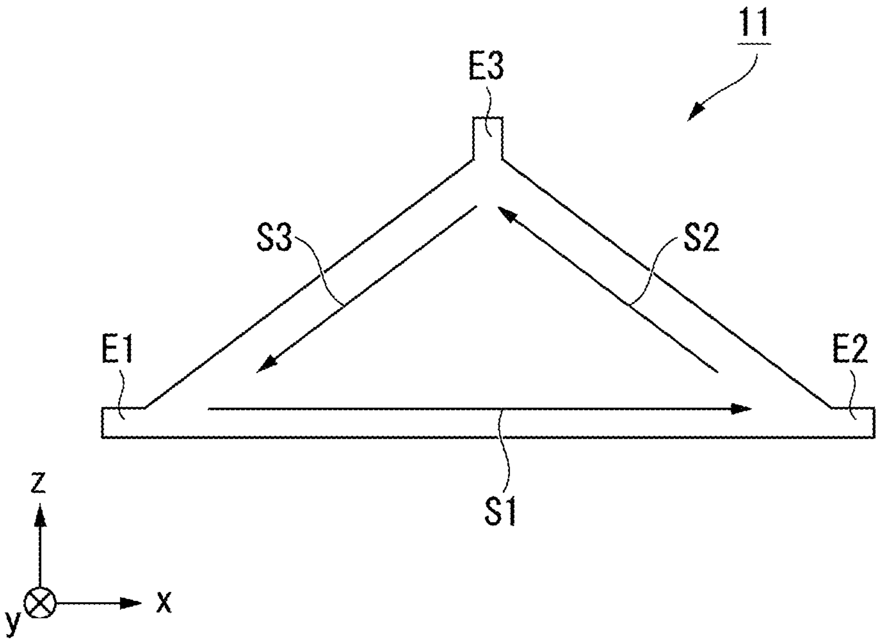
FIG. 3 is a plan view of a metal layer that constitutes the irreversible circuit plate according to the first embodiment.

FIG. 3 is a plan view of the metal layer 11 of the irreversible circuit plate 1. The metal layer 11 has, for example, a triangular shape when seen in a plan view.

The metal layer 11 has a first end E1, a second end E2 and a third end E3. Each of the first end E1, the second end E2 and the third end E3 corresponds to each apex of, for example, a triangular shape.

The first end E1 and the second end E2 are connected to the different terminals 2. Each of the first ends E1 of the irreversible circuit plates 1 is connected to the different terminals 2. Each of the second ends E2 of the irreversible circuit plates 1 is connected to the different terminals 2. In the example shown in FIG. 3, the third end E3 is not connected to the terminals 2. The third end E3 is connected to, for example, a terminating resistor.

Each of the first ends E1 is connected to any one of the terminals 2 connected to, for example, a first surface 3A of the housing 3. Each of the second ends E2 is connected to any one of the terminals 2 connected to, for example, a second surface 3B of the housing 3. The second surface 3B faces the first surface 3A.

The metal layer 11 transmits a high-frequency signal. The metal layer 11 transmits a high-frequency signal between the first end E1 and the second end E2 irreversibly. "Transmitting the high-frequency signal irreversibly" means that a propagation efficiency of the signal differs according to a direction. For example, a case in which almost no signal is propagated in a reverse direction while a signal is propagated in a forward direction with low loss corresponds to "the high-frequency signal is transmitted irreversibly." A propagation direction of the high-frequency signal in the metal layer 11 is controlled by the loss layer 13, which will be described below.

A high-frequency signal S1 input from the first end E1 is transmitted to the second end E2 with low loss. A high-frequency signal S2 input from the second end E2 is transmitted to the third end E3 with low loss. A high-frequency signal S3 input from the third end E3 is transmitted to the first end E1 with low loss. The high-frequency signal S2 input from the second end E2 is absorbed by a terminating resistor connected to a third terminal t3 and hardly transmitted from the third end E3 to the first end E1. That is, the high-frequency signal is transmitted from the first end E1 toward the second end E2 with low loss but hardly transmitted from the second end E2 to the first end E1.

The metal layer 11 is not particularly limited as long as the high-frequency signal is transmitted with high efficiency. The metal layer 11 is, for example, aluminum, copper, silver, gold, stainless steel, or the like.

The first insulating layer 12 comes into contact with one surface of the metal layer 11. The first insulating layer 12 is located between the metal layer 11 and the loss layer 13. The first insulating layer 12 insulates the metal layer 11 and the loss layer 13 from each other. A material that configures the first insulating layer 12 may be a known material.

Figure 4:
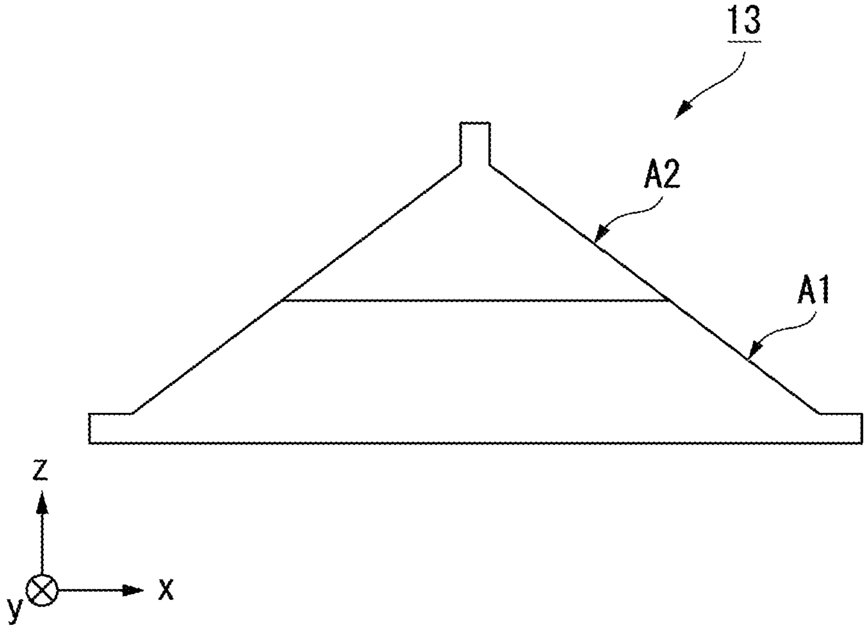
FIG. 4 is a plan view of a loss layer of the irreversible circuit plate according to the first embodiment.

FIG. 4 is a plan view of the loss layer 13 of the irreversible circuit plate 1. The loss layer 13 has, for example, a shape when seen in a plan view, which substantially coincides with the metal layer 11. A shape of the loss layer 13 when seen in a plan view need not be a triangular shape like the metal layer 11 but may be a quadrangular shape or the like. The loss layer 13 is located between the metal layer 11 and the first magnetic field applying layer 14.

The loss layer 13 has, for example, a first region A1 and a second region A2 in a plane. The first region A1 is located between the first end E1 and the second end E2, for example, when seen in a plan view in the y direction. The second region A2 is located at a position overlapping the third end E3, for example, when seen in a plan view in the y direction. A boundary between the first region A1 and the second region A2 is provided between the first end E1 and the third end E3 and between the second end E2 and the third end E3 when seen in a plan view in the y direction.

The loss layer 13 attenuates the magnetic field generated by the first magnetic field applying layer 14 before reaching the metal layer 11. The intensity of the magnetic field reaching the metal layer 11 is different when the magnetic flux passes through the first region A1 and when passing through the second region A2. For this reason, the intensity of the magnetic field applied according to a place of the metal layer 11 differs. The second region A2 greatly attenuates the magnetic field applied to the metal layer 11 by the first region A1. Since the intensity of the magnetic field applied to the metal layer 11 differs according to the place, a loss rate of the high-frequency signal that is transmitted through the metal layer 11 differs according to the place.

The loss layer 13 has a magnetic material at least on the first region A1. The first region A1 and the second region A2 have, for example, a soft magnetic material. The first region A1 and the second region A2 include any one selected from the group consisting of, for example, Co-based amorphous, ferrite, $Fe_{85}Si_2B_8P_4Cu$, $Fe_{86}AlB_8P_4Cu$, $Fe_{78}Si_9B_{13}$, yttrium-iron-garnet (YIG), iron, BN, conductive carbon, SiC, and Ni-based ferrite. The YIG is, for example, $Y_3Fe_2(FeO_4)_3$ or $Y_3Fe_5O_{12}$. The first region A1 and the second region A2 may be appropriately selected from these materials according to the loss rate of the magnetic field.

The first region A1 includes any one selected from the group consisting of, for example, Co-based amorphous, ferrite, $Fe_{85}Si_2B_8P_4Cu$, $Fe_{86}AlB_8P_4Cu$, $Fe_{78}Si_9B_{13}$, and yttrium-iron-garnet (YIG). The first region A1 is preferably yttrium-iron-garnet (YIG).

The second region A2 includes any one selected from the group consisting of, for example, iron, BN, conductive carbon, SiC, and Ni-based ferrite.

In addition, in the first region A1 and the second region A2, the first region A1 may be formed by mixing magnetic particles and a resin. The magnetic particles include, for example, iron, silicon steel (Fe—Si), Permalloy (Ni—Fe), Permendur (Fe—Co), Sendust (Fe—Si—Al), electromagnetic stainless steel, amorphous iron-based alloys (Fe—B—C-based, Fe—Co-based), manganese-zinc ferrite, nickel-zinc ferrite, and the like. The first region A1 may be formed by mixing the ferrite particles and the resin.

When the magnetic material is distributed in an insulating material (for example, a resin, rubber, paint, or the like), a volume ratio of a magnetic material is preferably 10% or more and 70% or less. When the volume ratio of the magnetic material is reduced, an electromagnetic wave absorption capacity is reduced. When the volume ratio of the magnetic material is increased, distribution to the insulating material becomes difficult.

The second region A2 includes, for example, a hard magnetic body. The second region A2 may not include a magnetic material. The second region A2 includes, for example, iron, boron nitride (BN), conductive carbon, silicon carbide (SiC), and Ni-based ferrite.

The first magnetic field applying layer 14 comes into contact with one surface of the loss layer 13. The first magnetic field applying layer 14 sandwiches the loss layer 13 together with the first insulating layer 12. The first magnetic field applying layer 14 is, for example, a hard magnetic body. The first magnetic field applying layer 14 may be an insulating layer or a conductive layer. The first magnetic field applying layer 14 includes any one selected from the group consisting of, for example, TbFeCo, GdFeCo, SmFeCo, (Co/Pt) multilayer film, and (Co/Pd) multilayer film.

When the first magnetic field applying layer 14 is a metal, a large magnetic field can be generated even with a thin film thickness. The thickness of the irreversible circuit plate 1 can be reduced by setting the first magnetic field applying layer 14 as a conductive magnetic layer. When the thickness of the irreversible circuit plate 1 is small, a larger number of irreversible circuit plates 1 can be integrated in the housing 3.

Next, an example of a method of manufacturing the irreversible circuit element 100 according to the embodiment will be described. First, the method of manufacturing the irreversible circuit plate 1 will be described.

First, a metal foil is prepared as the metal layer 11. Then, an insulating layer 12 is formed on one surface of the metal layer 11. The insulating layer 12 can be formed on one surface of the metal layer 11 through a known method. For example, the insulating paste may be applied on one surface of the metal layer 11, or the insulating material may be formed through film formation using a sputtering method or the like.

Next, the loss layer 13 is formed on the insulating layer 12 of the metal layer 11 on which the insulating layer 12 is laminated. The loss layer 13 can be formed through film formation using, for example, a sputtering method. When the loss layer 13 is a metal magnetic layer, a sufficient magnetic field can be generated even with a thickness that can be formed through film formation using the sputtering method.

In addition, the loss layer 13 may be formed using a nanoimprint method. For example, the loss layer 13 in which the magnetic material is scattered in the plane can be formed by pressing a mold having a nano structure against the paste in which the magnetic material is distributed.

Next, the first magnetic field applying layer 14 is formed through film formation on the loss layer 13. The first magnetic field applying layer 14 can be formed using, for example, a sputtering method.

Each of the irreversible circuit plates 1 fabricated in the above-mentioned sequence is connected to each of the terminals 2. The irreversible circuit plates 1 are disposed such that main surfaces thereof face each other. The irreversible circuit element 100 according to the embodiment can be fabricated in such a sequence.

In the irreversible circuit element 100 according to the embodiment, since the adjacent irreversible circuit plates 1 are disposed to face each other, a large number of irreversible circuit plates 1 can be integrated in the housing 3. Since a large number of irreversible circuit plates 1 can be integrated in a predetermined space, even when a plurality of irreversible circuit plates 1 are required, the entire size of the irreversible circuit element 100 can be reduced. That is, the irreversible circuit element 100 according to the embodiment can simultaneously process a plurality of signals in a small space.

In addition, the thickness of the irreversible circuit plate 1 itself in the y direction can be reduced by forming the loss layer 13 through film formation. In addition, the magnetic body can be scattered in the plane by forming the loss layer 13 using the nanoimprint, and occurrence of eddy current can be suppressed.

So far, although an example of a preferred aspect of the present invention has been shown, present invention is not limited to these embodiments, and various variants are possible.

Figure 5:
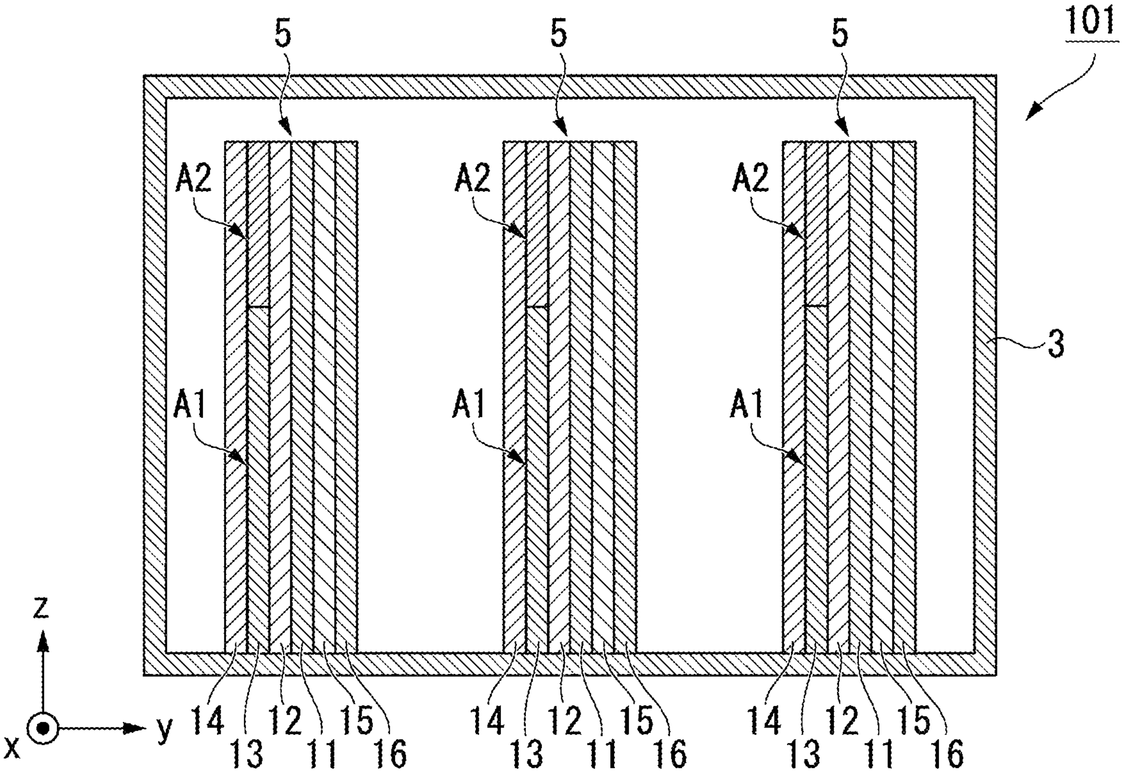
FIG. 5 is a cross-sectional view of an irreversible circuit element according to a first variant.

FIG. 5 is a cross-sectional view of an irreversible circuit element 101 according to a first variant. In the irreversible circuit element 101, a configuration of an irreversible circuit plate 5 is different from that of the irreversible circuit element 100.

The irreversible circuit plate 5 has a metal layer 11, a first insulating layer 12, a loss layer 13, a first magnetic field applying layer 14, a second insulating layer 15, and a second magnetic field applying layer 16. The second insulating layer 15 is located at a side opposite to a surface of the metal layer 11 with which the first insulating layer 12 comes into contact. The second insulating layer 15 is located between the metal layer 11 and the second magnetic field applying layer 16. The second magnetic field applying layer 16 is located at a side opposite to a surface of the second insulating layer with which the metal layer 11 comes into contact.

The second insulating layer 15 includes the same material as the material that configures the first insulating layer 12. The second magnetic field applying layer 16 includes the same material as that of the first magnetic field applying layer 14. The second magnetic field applying layer 16 includes any one selected from the group consisting of, for example, TbFeCo, GdFeCo, SmFeCo, (Co/Pt) multilayer film, and (Co/Pd) multilayer film.

A direction of the magnetic field applied to the metal layer 11 is made perpendicular to the metal layer 11 by sandwiching the metal layer 11 between the first magnetic field applying layer 14 and the second magnetic field applying layer 16. That is, a magnetic flux is uniformly applied to the metal layer 11. As a result, the irreversible circuit plate 5 has high irreversibility of signal transmission.

Figure 6:
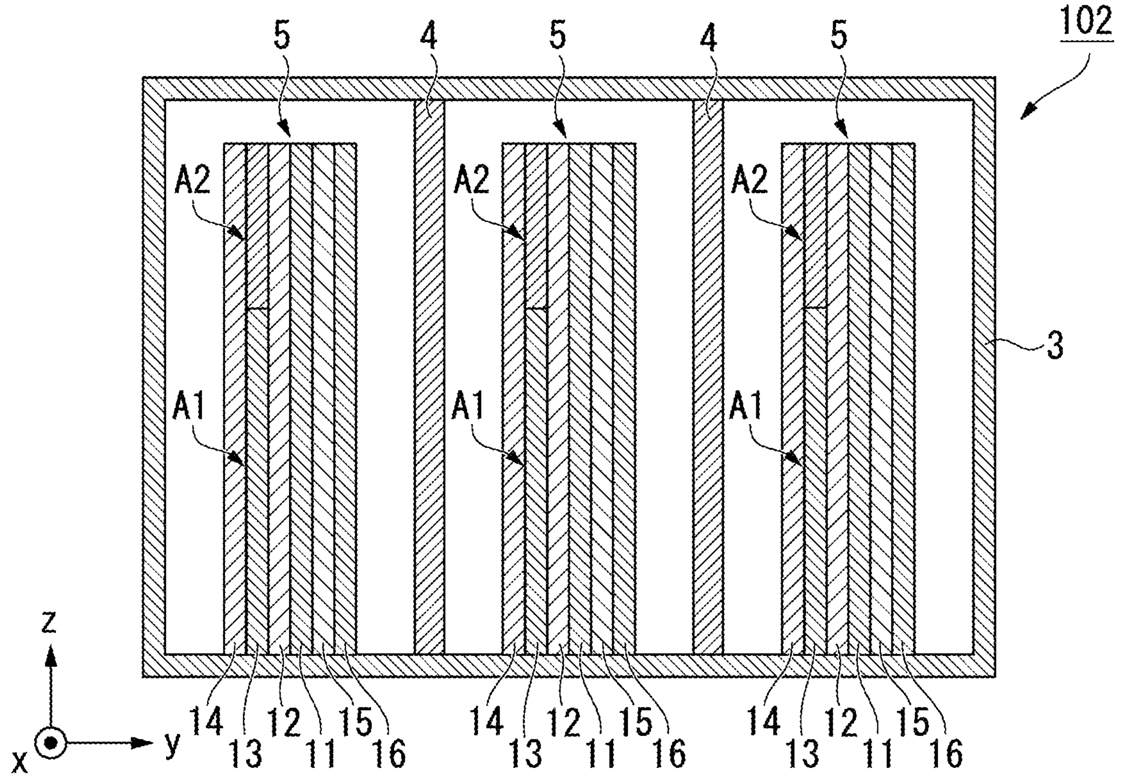
FIG. 6 is a cross-sectional view of an irreversible circuit element according to a second variant.

FIG. 6 is a cross-sectional view of an irreversible circuit element 102 according to a second variant. The irreversible circuit element 102 further includes a magnetic shield layer 4. The magnetic shield layer 4 is located between the adjacent irreversible circuit plates 1. The magnetic shield layer 4 prevents the adjacent irreversible circuit plates 1 from magnetically affecting each other. The magnetic shield layer 4 prevents interference of the high-frequency signal and enhances accuracy of signal processing.

Figure 7:
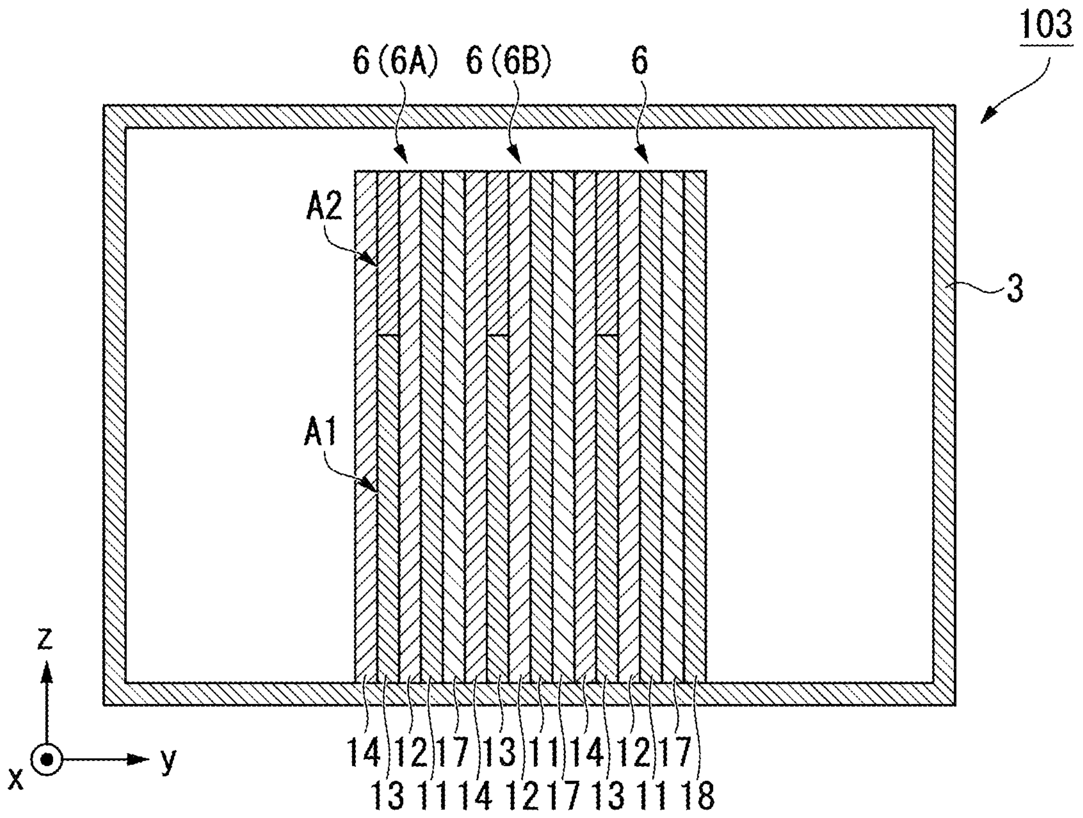
FIG. 7 is a cross-sectional view of an irreversible circuit element according to a third variant.

FIG. 7 is a cross-sectional view of an irreversible circuit element 103 according to a third variant. In the irreversible circuit element 103, a configuration of an irreversible circuit plate 6 is different from that of the irreversible circuit element 100.

The irreversible circuit plate 6 has a metal layer 11, a first insulating layer 12, a loss layer 13, a first magnetic field applying layer 14, and a third insulating layer 17. The third insulating layer 17 is located at a side opposite to a surface of the metal layer 11 with which the first insulating layer 12 comes into contact. The third insulating layer 17 includes the same material as the material that configures the first insulating layer 12.

A plurality of irreversible circuit plates 6 are adjacent to each other. A first irreversible circuit plate 6A and a second irreversible circuit plate 6B among the adjacent irreversible circuit plates 6 come into contact with the third insulating layer 17 of the first irreversible circuit plate 6A and the first magnetic field applying layer 14 of the second irreversible circuit plate 6B.

The first magnetic field applying layer 14 of the second irreversible circuit plate 6B performs the same function as the second magnetic field applying layer 16 (see FIG. 5) for a first irreversible circuit plate 6A. When the metal layer 11 is sandwiched between the two magnetic field applying layers, a direction of the magnetic field applied to the metal layer 11 is perpendicular to the metal layer 11. That is, a magnetic flux is uniformly applied to the metal layer 11. As a result, the irreversible circuit plate 6 has high irreversibility of signal transmission. In addition, a third magnetic field applying layer 18 may be provided on one surface of the laminated irreversible circuit plate 6. The third magnetic field applying layer 18 has the same configuration as that of a first magnetic field applying layer 13.

Figure 8:
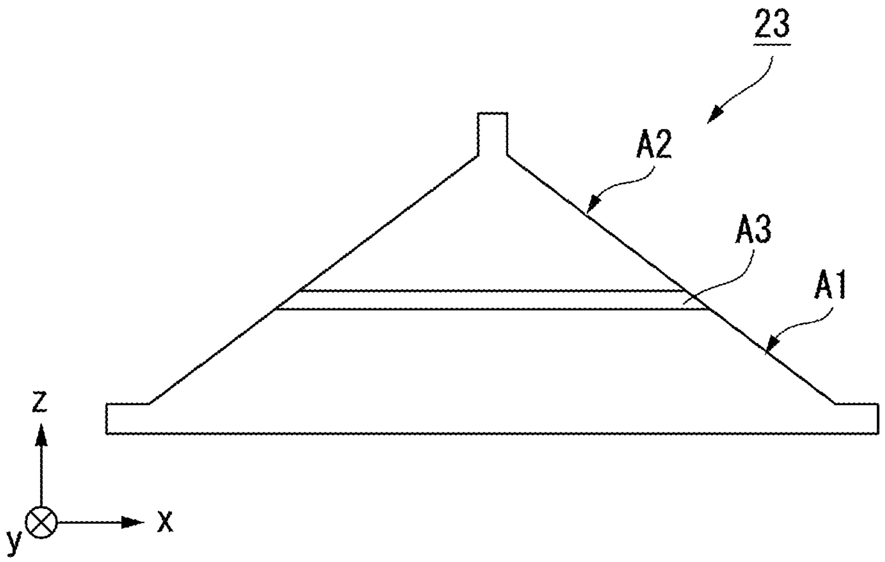
FIG. 8 is a plan view of a loss layer of an irreversible circuit plate according to a fourth variant.

FIG. 8 is a plan view of a loss layer 23 of an irreversible circuit element according to a fourth variant. The loss layer 23 has the first region A1, the second region A2 and an insulating region A3 in a plane. The insulating region A3 is located between the first region A1 and the second region A2. The insulating region A3 electrically or magnetically separates the first region A1 and the second region A2 from each other. The insulating region A2 may electrically and magnetically separate the first region A1 and the second region A2 from each other.

When the high-frequency signal is transmitted through the irreversible circuit plate, temperatures of the first region A1 and the second region A2 are increased. Since the first region A1 and the second region A2 are formed of different materials, volume change amounts with respect to the temperature changes are different. When the first region A1 and the second region A2 come into contact with each other, a distortion may occur upon the volume change, or the loss layer may be separated from the insulating layer. The insulating region A3 attenuates a distortion generated between the first region A1 and the second region A2.

Figure 9:
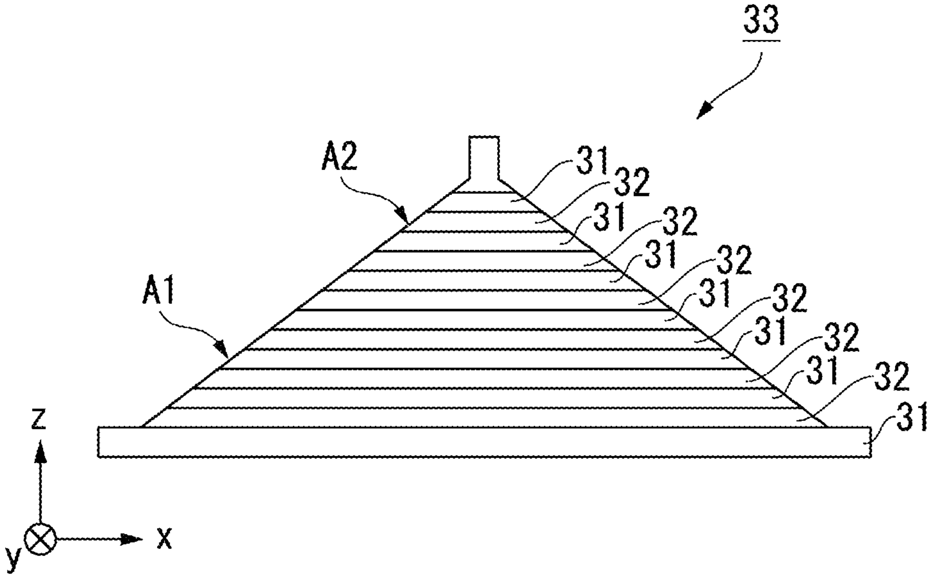
FIG. 9 is a plan view of a loss layer of an irreversible circuit plate according to a fifth variant.

FIG. 9 is a plan view of a loss layer 33 of an irreversible circuit element according to a fifth variant. The loss layer 33 has ferromagnetic layers 31 and an insulating layer 32 alternately in a plane. The ferromagnetic layers 31 are separated from each other and insulated by the insulating layer 32. The ferromagnetic layers 31 are alternately arranged in one direction (for example, the z direction) in the plane with the insulating layer 32 sandwiched therebetween. The ferromagnetic layer 31 that constitutes the first region A1 and the ferromagnetic layer 31 that constitutes the second region A2 are formed of different constituent materials.

Each of the ferromagnetic layers 31 may be a ferromagnetic layer formed of, for example, a metal. Since the ferromagnetic layers 31 are separated by the insulating layer 32, even when the ferromagnetic layer 31 has conductivity, an eddy current is less likely to occur in the ferromagnetic layer 31. The eddy current is a source of an unexpected magnetic field, and causes a decrease in transmission efficiency of the high-frequency signal.

Figure 10:
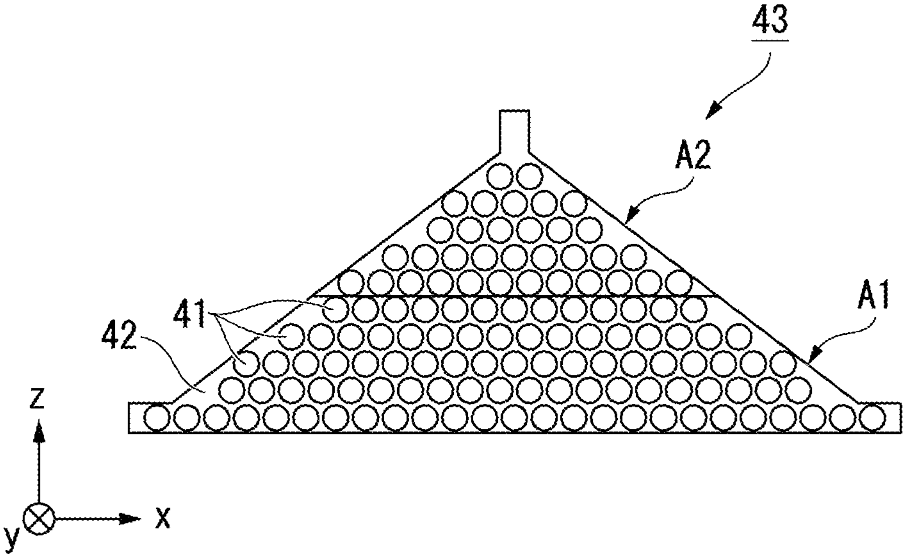
FIG. 10 is a plan view of a loss layer of an irreversible circuit plate according to a sixth variant.

FIG. 10 is a plan view of a loss layer 43 of an irreversible circuit element according to a sixth variant. The loss layer 43 has ferromagnetic layers 41 distributed in an islands shape in the plane, and an insulating layer 42 located between them. The ferromagnetic layers 41 are separated from each other and insulated by the insulating layer 42. The ferromagnetic layers 41 are arranged in, for example, the closest packing arrangement. The ferromagnetic layer 41 that constitutes the first region A1 and the ferromagnetic layer 41 that constitutes the second region A2 are formed of different constituent materials.

Each of the ferromagnetic layers 41 may be a ferromagnetic layer formed of, for example, a metal. Since the ferromagnetic layers 41 are separated by the insulating layer 42, even when the ferromagnetic layer 41 has conductivity, eddy current is less likely to occur in the ferromagnetic layer 41. The loss layer 43 can be fabricated through, for example, nanoimprint.

Figure 11:
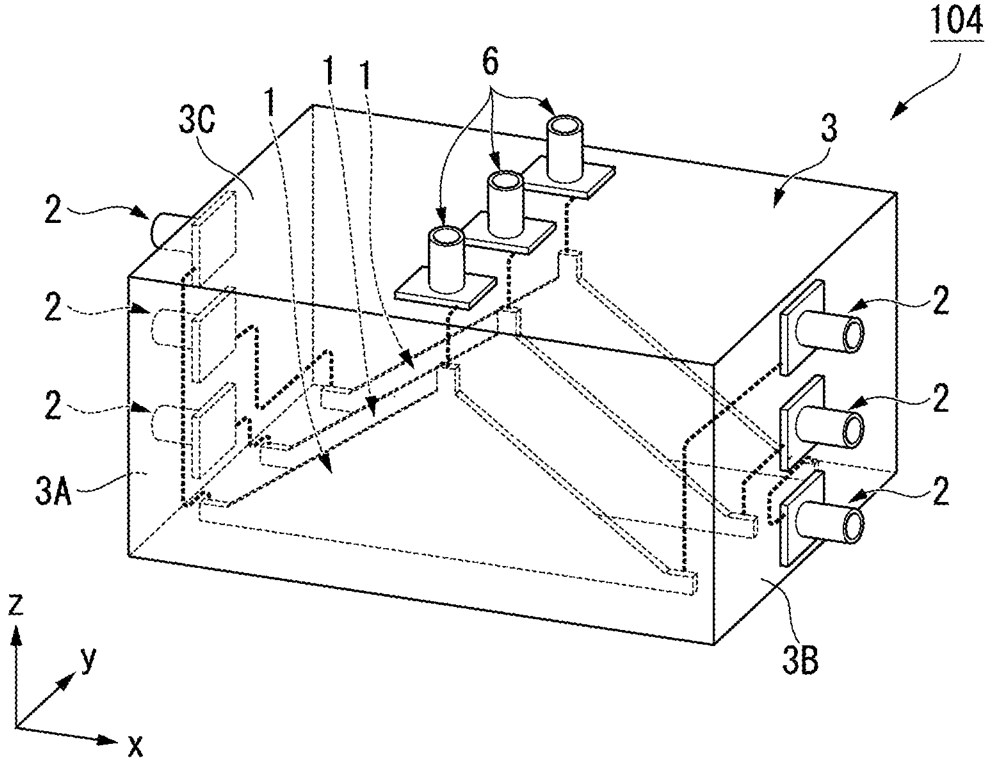
FIG. 11 is a perspective view of an irreversible circuit element according to a seventh variant.

FIG. 11 is a perspective view of an irreversible circuit element 104 according to a seventh variant. The irreversible circuit element 104 has the terminals 2 also on a third surface 3C of the housing 3, and the terminals 2 of the third surface 3C are connected to a third end of the irreversible circuit plate 1. The irreversible circuit element 104 shown in FIG. 11 functions as, for example, a circulator.

The high-frequency signal S1 input from the first end E1 is transmitted through the second end E2 with low loss. The high-frequency signal S2 input from the second end E2 is transmitted through the third end E3 with low loss. The high-frequency signal S3 input from the third end E3 is transmitted through the first end E1 with low loss. A signal is irreversibly transmitted between the first end E1 and the second end E2, between the second end E2 and the third end E3, and between the third end E3 and the first end E1.

The characteristic configuration of each of the embodiment and the variants may be applied to another embodiment.

REFERENCE SIGNS LIST

- 1, 5, 6 Irreversible circuit plate
- 2 Terminal
- 3 Housing
- 3A First surface
- 3B Second surface
- 3C Third surface
- 4 Magnetic shield layer
- 6A First irreversible circuit plate
- 6B Second irreversible circuit plate
- 11 Metal layer
- 12 First insulating layer
- 13, 23, 33, 43 Loss layer
- 14 First magnetic field applying layer
- 15 Second insulating layer
- 16 Second magnetic field applying layer
- 17 Third insulating layer

18 Third magnetic field applying layer
31, 41 Ferromagnetic layer
32, 42 Insulating layer
100, 101, 102, 103, 104 Irreversible circuit element
A1 First region
A2 Second region
A3 Insulating region
E1 First end
E2 Second end
E3 Third end

What is claimed is:

1. An irreversible circuit element comprising: a housing; a plurality of irreversible circuit plates accommodated in the housing; and a plurality of terminals connected to an outer surface of the housing, wherein the plurality of irreversible circuit plates are arranged such that the adjacent irreversible circuit plates face each other, each of the plurality of irreversible circuit plates includes a metal layer, a first insulating layer, a loss layer, and a first magnetic field applying layer laminated in sequence in a thickness direction, each of the plurality of irreversible circuit plates transmits a signal irreversibly between a first end and a second end, and the first end and the second end of each of the plurality of irreversible circuit plates are connected to different terminals of the plurality of terminals.

2. The irreversible circuit element according to claim 1, wherein the first end of each of the plurality of irreversible circuit plates is connected to any one of terminals connected to a first surface of the housing among the plurality of terminals, and the second end of each of the plurality of irreversible circuit plates is connected to any one of terminals connected to a second surface of the housing facing the first surface of the housing among the plurality of terminals.

3. The irreversible circuit element according to claim 2, wherein at least one of the plurality of irreversible circuit plates further comprises a third end, each signal is irreversibly transmitted between the first end and the second end, between the second end and the third end, and between the third end and the first end, and the third end is connected to any one of the plurality of terminals.

4. The irreversible circuit element according to claim 2, wherein the first magnetic field applying layer includes any one selected from the group consisting of TbFeCo, GdFeCo, SmFeCo, a (Co/Pt) multilayer film, and a (Co/Pd) multilayer film.

5. The irreversible circuit element according to claim 2, wherein each of the plurality of irreversible circuit plates further includes a second insulating layer and a second magnetic field applying layer, and the second insulating layer is located between the metal layer and the second magnetic field applying layer.

6. The irreversible circuit element according to claim 2, further comprising at least one or more magnetic shield layers, wherein the magnetic shield layer is located between the adjacent irreversible circuit plates.

7. The irreversible circuit element according to claim 1, wherein at least one of the plurality of irreversible circuit plates further comprises a third end, each signal is irreversibly transmitted between the first end and the second end, between the second end and the third end, and between the third end and the first end, and the third end is connected to any one of the plurality of terminals.

8. The irreversible circuit element according to claim 1, wherein the first magnetic field applying layer includes any one selected from the group consisting of TbFeCo, GdFeCo, SmFeCo, a (Co/Pt) multilayer film, and a (Co/Pd) multilayer film.

9. The irreversible circuit element according to claim 1, wherein each of the plurality of irreversible circuit plates further includes a second insulating layer and a second magnetic field applying layer, and the second insulating layer is located between the metal layer and the second magnetic field applying layer.

10. The irreversible circuit element according to claim 9, wherein the second magnetic field applying layer includes any one selected from the group consisting of TbFeCo, GdFeCo, SmFeCo, (Co/Pt) multilayer film, and (Co/Pd) multilayer film.

11. The irreversible circuit element according to claim 1, further comprising at least one or more magnetic shield layers, wherein the magnetic shield layer is located between the adjacent irreversible circuit plates.

12. The irreversible circuit element according to claim 1, wherein each of the plurality of irreversible circuit plates further includes a third insulating layer opposite to the first insulating layer with reference to the metal layer, and a first irreversible circuit plate and a second irreversible circuit plate among the adjacent irreversible circuit plates come into contact with the third insulating layer of the first irreversible circuit plate and the first magnetic field applying layer of the second irreversible circuit plate.

13. The irreversible circuit element according to claim 1, wherein the loss layer has a first region between the first end and the second end, and a second region, in which a magnetic field applied to the metal layer by the first region is greatly attenuated, in a plane, and the first region has at least a magnetic material.

14. The irreversible circuit element according to claim 13, wherein the first region includes any one selected from the group consisting of Co-based amorphous, ferrite, $Fe_{85}Si_2B_8P_4Cu$, $Fe_{86}AlB_8P_4Cu$, $Fe_{78}Si_9B_{13}$, and yttrium-iron-garnet (YIG).

15. The irreversible circuit element according to claim 13, wherein the second region includes any one selected from the group consisting of iron, BN, conductive carbon, SiC, and Ni-based ferrite.

16. The irreversible circuit element according to claim 13, further comprising an insulating region between the first region and the second region, wherein the insulating region electrically or magnetically insulates the first region and the second region from each other.

17. The irreversible circuit element according to claim 1, wherein the loss layer has a plurality of ferromagnetic layers separated and arranged in a plane, and the plurality of ferromagnetic layers are alternately arranged in one direction in the plane with the insulating layer sandwiched therebetween.

18. The irreversible circuit element according to claim 1, wherein the loss layer has a plurality of ferromagnetic layers scattered in an islands shape in a plane, and the plurality of ferromagnetic layers are arranged in closest packing.

19. A method of manufacturing an irreversible circuit element, comprising the steps of:

laminating a loss layer on an insulating layer, which is laminated on a metal layer, using a sputtering method and producing an irreversible circuit plate; and connecting each of a plurality of irreversible circuit plates including the irreversible circuit plate to a terminal.

20. A method of manufacturing an irreversible circuit element, comprising the steps of:

forming a loss layer on an insulating layer, which is laminated on a metal layer, using a nanoimprint method and producing an irreversible circuit plate; and connecting each of a plurality of irreversible circuit plates including the irreversible circuit plate to a terminal.

* * * * *